May 9, 1950 L. E. BLISS 2,507,138
SHADOW SCREEN FOR OPTICAL COMPARATORS
Filed March 12, 1946
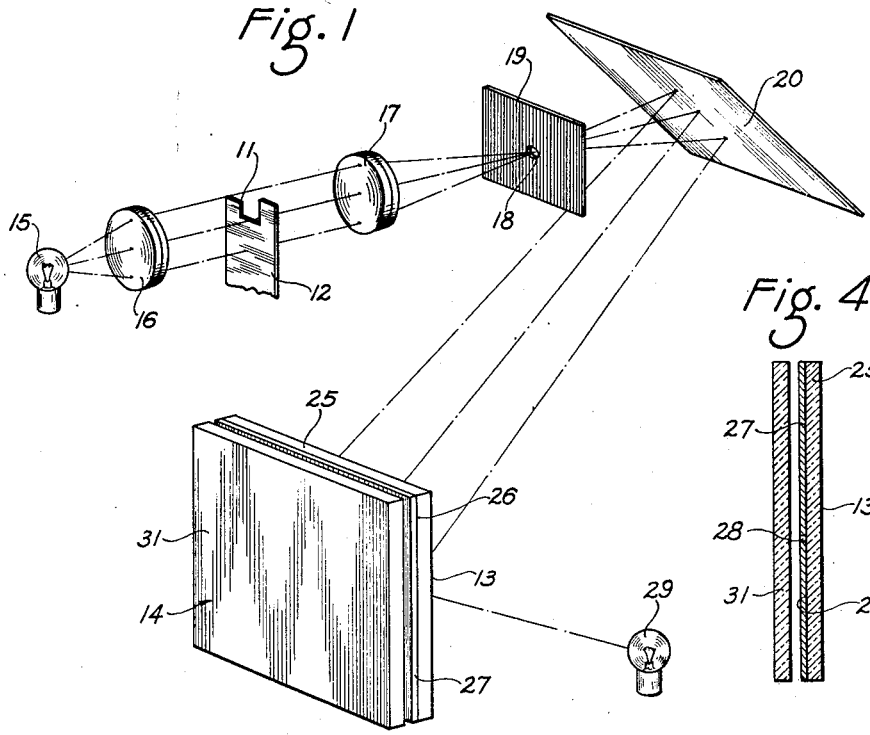
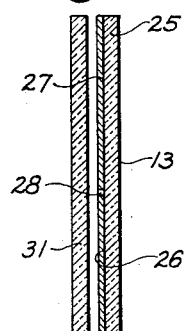
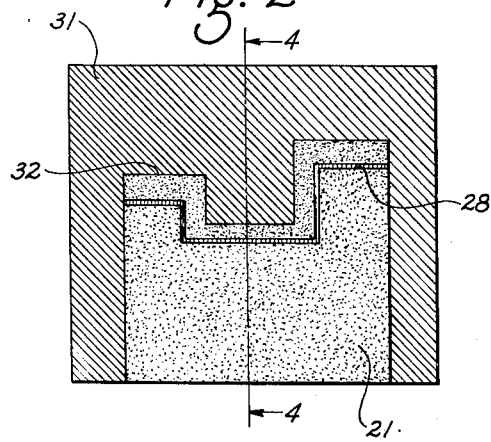
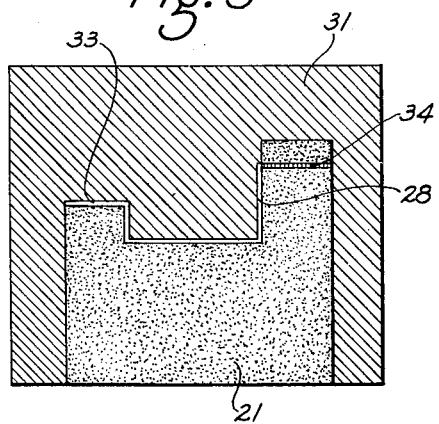
Lester E. Bliss
INVENTOR
BY *Newton M. Perrins*
*J. Griffin Little*
ATTORNEYS Patented May 9, 1950

2,507,138

UNITED STATES PATENT OFFICE 2,507,138

SHADOW SCREEN FOR OPTICAL COMPARATORS

Lester E. Bliss, Rochester, N. Y., assignor to Eastman Kodak Company, Rochester, N. Y., a corporation of New Jersey Application March 12, 1946, Serial No. 653,749

9 Claims. (Cl. 88—24)

The present invention relates to optical contour comparators, and more particularly to a new and improved shadow screen or plate therefor.

It has long been common practice to check the accuracy of profiles, such as the shape or contour of a thread or gear tooth, by the use of a contour projector or comparator. With such an apparatus, an enlarged shadow image of a contour or profile of the object to be inspected is projected onto a shadow screen or plate. This contour is then compared with a master drawing, enlarged to the same magnification of the shadow image. This drawing may be placed on the shadow screen which, in such case is usually a ground glass plate, or the drawing may be suitably formed directly on the plate itself, as is common practice. Such inspection or comparison may be accomplished while the object is being shaped, or the object may be periodically removed from its forming machine and placed in position in the comparator, all of which is well known. In either case, the magnified projected contour or profile of the object is compared with the contour of the master drawing arranged on and co-operating with the shadow plate or screen.

These shadow plates are formed in various ways. In one arrangement, a contact negative is made of the drawing, and a contact positive is then made from the negative. This positive is then used either directly as the shadow plane or in co-operation therewith. It was found, however, that even with accurately made drawings, the thickness of the lines was sufficient to throw off the accuracy of the object being operated upon or inspected. In order to overcome this difficulty and to assure greater accuracy, drawings were then made on an enlarged scale and the negative was made from these drawings by reduction. Such an arrangement will serve to reduce the thickness of the lines and thus assure greater accuracy. A contact positive was then made from the reduced negative, and this positive was used as a shadow screen or in cooperation therewith, the negative and positive being formed on photographic plates so as not to be subject to a dimensional change and thus insure accuracy of dimensions.

When such positive plates were used, the positives were a true reproduction of the original drawing, and the lines thereof were, of necessity, opaque. It was found that under such conditions, such opaque lines were a distinct disadvantage. For example, in an operation where the profile or shadow image was continually compared with a drawing on the shadow plane during the cutting or grinding operation, the edge of the shadow image would finally be merged in the opaque line on the shadow plane, and the exact location of such edge could not be definitely ascertained. If machining was continued until the edge appeared on the opposite side of the opaque line, the part might be over or under-machined and thus rendered useless, particularly when narrow tolerances must be maintained. To overcome these disadvantages, the lines were made broken so that clear or transparent portions are provided so that the exact position of the profile edge can be definitely ascertained. While this last-mentioned arrangement provides decided advantages over prior methods, it still does not provide the desired results.

The disadvantages of the opaque lines can, of course, be overcome somewhat by providing the shadow plate with a light-retarding coating which is cut away, removed or altered at the points corresponding to the outline of the profile. Such a plate would provide clear, transparent or less dense lines representing the contour or profile, and a background of greater density than the lines. When, however, the shadow image of the object being inspected is larger than the clear lines on the shadow screen, the lines are positioned within the shadow and are either lost or not readily visible. This is due to the lack of contrast between the main body or background of the plate and the clear lines representing the contour to which the object is to be worked. The disadvantages of such an arrangement are readily apparent to those familiar with devices of this type.

To overcome these disadvantages, the present invention provides a shadow plate or screen which is provided with a dyed coating or layer. Like the arrangement described in the above paragraph, the dyed coating is removed at points corresponding to the outline of the profile to provide a colored background with clear lines which constitute an enlarged reproduction of the final profile or contour of the object being inspected. This coating can be removed by the well known methods of scribing and the scribed plates can then be used directly as a shadow plate. On the other hand, a duplicate can be made, by photographing processes, from the scribed plate, and this photographic duplicate can then be used as the shadow screen. This duplicate is, however, an exact reproduction of the original scribed plate and has a colored background with the coating removed at the points corresponding to the lines of the drawings. The shadow image of the object is then projected onto this colored or dyed shadow plate. However, in order to provide and assure the desired and necessary contrast between the colored background and the clear or transparent lines, the shadow plate is back-illuminated by an auxiliary light of a color which is complementary to the color of the dyed layer or background. The latter will absorb the light of the auxiliary source, but the rays of the latter will be clearly visible where the coating has been removed, that is at the clear or transparent portions. Thus, the background of the plate, illuminated by the shadow-forming light, and the portions forming the lines in the shadow and illuminated by the auxiliary light will be illuminated in complementary colors that will thus be in vivid contrast, while the lines not in the shadow will be illuminated by the shadow-forming light. Thus, by the color of the lines, the operator is at all times able to determine the progress of the operation. It is to be understood however, that the portions of the background of the screen occupied by the shadow will be a much darker color, theoretically black, due to the absorption by the dye of the auxiliary light. The auxiliary light, however, should be of an intensity to illuminate the lines in shadow, but not capable of substantially changing the color of the lines not in shadow.

The present invention has, therefore, as its principal object the provision of a shadow plate which, when in use, provides a high degree of contrast between the plate background and the lines delineated thereon.

A further object of the invention is the provision of a shadow plate which provides an increase in contrast between the plate background and the shadow image projected thereon.

A still further object of the invention is the provision of a shadow screen which is admirably adapted for making exact reproductions.

Yet another object of the invention is the provision of a shadow plate which is accurate, provides the desired contrast, transmits more light, and is highly effective in use.

To these and other ends, the invention resides in certain improvements and combinations of parts, all as will be hereinafter more fully described, the novel features being pointed out in the claims at the end of the specification.

In the drawings:

Fig. 1 is a schematic layout of an optical contour or profile comparator, showing the relation thereto of a shadow plate or screen constructed in accordance with the preferred embodiment of the present invention;

Fig. 2 is a front view of the shadow screen showing the relation of the various parts and the shadow image;

Fig. 3 is a view similar to Fig. 2, but showing the relation of the parts when the object has been machined so that a portion of the profile or contour shadow coincides with the lines in the shadow plate; and Fig. 4 is a vertical sectional view through the shadow plate taken substantially on line 4—4 of Fig. 2, showing the relation of the various parts.

Similar reference numerals throughout the various views indicate the same parts.

Fig. 1 of the drawings shows a diagrammatical layout of an optical contour or profile comparator for projecting an enlarged shadow image of the profile or contour 11 of an object 12 onto the rear surface 13 of a shadow plate or screen, generally indicated by the numeral 14. The light source 15, of substantially white color, directs rays of light through a collimating lens 16 across the profile 11 to a second lens 17. The light rays then pass through a stop 18 formed in a plate 19 and are directed onto a mirror 20 which then reflects the rays or shadow of the profile 11 onto the rear surface 13 of the shadow plate or screen to form an enlarged shadow image 21 of the profile 11, all of which is well known to those in the art and will be apparent from an inspection of the drawings.

The shadow plate or screen of the present invention comprises a clear flat sheet of glass 25, the front surface 26 of which is covered with a dyed layer 27. This coating or layer has portions thereof removed or cut out down to the glass to provide clear uncoated and transparent sections 28 which constitute an enlarged reproduction of the final profile 11 made to the same scale as the shadow image enlargement. As mentioned above, these cut-out portions may be formed by scribing, or they may be formed by well-known photographic and chemical methods from a scribed plate. In either case, the coating covers the glass surface 26 at all points except where removed to form the transparent lines which are delineations of the final form to which the profile 11 is to be worked. The layer 27 comprises a layer of gelatin containing a suitable dye to color the layer. For example, the dye may be naphthol green-B, Schultz No. 5, 7th edition. This dye will color the layer 27 a green color. This green dye layer will permit the viewing of the shadow image 21 from the front side of the shadow plate, as will be apparent from an inspection of Fig. 2.

As mentioned above, when the shadow image 21 is larger than and covers lines 28, the light rays from the white light source 15 are blocked out and the lines 28 will be in shadow, as is apparent from an inspection of Fig. 2. However, in order to make the lines readily visible and to provide the desired contrast between these lines and the green background on the dyed layer 27, the present invention provides means for separately illuminating the lines 28. To secure this result, a second or auxiliary light source 29 is positioned behind the shadow plate or screen and is adapted to illuminate the rear surface 13 thereof. This light 29 is preferably of a color complementary to that of the green dye in the layer 27, such, for example, a magenta color. The dye of the layer 27 will absorb the magenta or red light emitted by the lamp 29 so that this red light will not be visible in the main body of the shadow plate. However, where the dyed layer has been removed, such as at lines 28, the red light will be visible so that the lines will appear red against a green background of the dyed layer. Thus, the shadow background of the plate will be dark due to the dyed layer, while the lines 28 will be red and will, therefore, be clearly visible even when covered by the shadow image 21, as shown in Fig. 2.

By means of such an auxiliary light of a complementary color, the operator will be able to see clearly the lines 28 within the shadow areas. Since the auxiliary light emits a color which is complementary to the color of the dyed layer, it will not interfere with the contrast between the light shadow and the dyed portions of the plate. The auxiliary light is so installed as to provide over-all illumination for the shadow plate, the light passing through the plate in the same direction as the light rays from the light 15. While the complementary colors of red and green have been described, this is by way of illumination only, as many other combinations of complementary colors may be used. For example, yellow dyed layers can be used with an auxiliary light of blue-green.

The present invention thus provides a shadow screen having a green background and transparent lines which may be illuminated with red light to provide the desired degree of contrast. Under certain conditions, it may be desirable to incorporate light-diffusion materials either in the dyed gelatin coating or as an adjacent layer. This adjacent layer may be in one of the following positions, either as a coating on the back side of the shadow plate, or between the front face 26 and the layer 27 or as an overcoating on the layer 27. It is preferred, however, to provide the light diffusing medium in the form of a translucent plate 31 positioned in contact with the dyed layer 27. For purpose of clarity, the plate 31 is shown slightly spaced from layer 27. The plate 31 serves to increase contrast between the shadow and the background of the shadow plate.

The shadow 21 and the lines 28 may readily appear as shown in Fig. 2 in which case the shadow background of the shadow plate will be dark and the lines will be red, as mentioned above. When, however, the profile is worked down, the upper edge 32 of the shadow image will approach and finally reach and coincide with the line 28, as shown at 33, Fig. 3. When this position is reached, the left portion of the contour of the profile 11 has been worked to the proper dimension. When this position is reached, the shadow image 21 no longer covers the left portion of the line 28 so that the latter will now be illuminated by the white light 15 while the right portion 34 which is still in the shadow will be red. Thus so long as the shadow image 21 covers the lines 28, the latter will be red, but when the proper dimension for the profile 11 has been reached, the corresponding portions of line 28 will be illuminated white, showing that the proper dimension has been reached, the advantages of which will be readily apparent to those in the art.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

What I claim is:

1. In an optical contour comparator, means for projecting an enlarged shadow image of a contour of an object to be inspected, a shadow plate positioned in the path of the projected image to receive the latter, said plate having a surface thereof coated with a light retarding material, portions of said material being removed to provide sections of greater transparency than said material and constituting an enlarged reproduction of the final contour of said object, and separate means for illuminating said portions to afford contrast between said material and said portions.

2. In an optical contour comparator, means for projecting an enlarged shadow image of a contour of an object to be inspected, a shadow plate positioned in the path of the projected image to receive the latter, said plate having a surface thereof coated with a colored light retarding material, portions of said material being removed to provide clear sections of greater transparency than said material and constituting an enlarged reproduction of the final contour of said object, and separate means for illuminating said clear sections with a color complementary to the color of said material to afford contrast between said material and said sections.

3. In an optical contour comparator, means for projecting an enlarged shadow image of a contour of an object to be inspected, a shadow plate positioned in the path of the projected image to receive the latter, said plate having the front surface thereof coated with a dyed gelatin layer, portions of said layer being removed to provide clear uncoated sections of greater transparency and constituting an enlarged reproduction of the final contour of said object, and a colored light source positioned behind said plate and of a color complementary to the color of the dyed gelatin layer so as to be visible only through said sections to afford contrast between the latter and said dyed gelatin layer.

4. In an optical contour comparator, means for projecting an enlarged shadow image of a contour of an object to be inspected, a shadow plate positioned in the path of the projected image to receive the latter, said plate having the front surface thereof coated with a gelatin layer containing a green dye, portions of said gelatin layer being removed to provide clear uncoated sections of greater transparency and constituting an enlarged reproduction of the final contour of said object, and a magenta light source positioned behind and illuminating the back of said plate, said light source being of a color complementary to that of said gelatin layer so as to be absorbed thereby but to be visible through said sections to color the latter magenta to afford contrast with the green of the gelatin layer.

5. In an optical contour comparator, means including a white light for projecting an enlarged shadow image of a contour of an object to be inspected, a transparent shadow plate positioned in the path of said white light and adapted to receive the shadow image, said plate having the front surface thereof coated with a gelatin layer containing a green dye to reduce the light transmission therethrough, portions of said gelatin layer being removed to provide clear uncoated sections of greater transparency than said coating and constituting an enlarged reproduction of the final contour of said object, and a magenta light source positioned behind and illuminating the rear surface of said plate, said magenta light being complementary in color to said gelatin layer and being absorbed thereby but being visible through all of said sections to provide a color contrast between said gelatin layer and said sections when the shadow image does not coincide with any of said sections, but the coincidence of a part of the shadow image with the corresponding section when serving to uncover said last section to render said white light available to illuminate said last sections to render the latter colorless to indicate which parts of the object have been worked to the desired point.

6. The method of inspecting a contour of an object comprising, providing a shadow plate the front surface of which is coated with a dyed layer, removing portions of said layer to provide sections of greater transparency which constitute an enlarged reproduction of the final contour of an object to be inspected, projecting an enlarged image of the contour of said object onto the back surface of said shadow plate, and then illuminating the back of said plate with auxiliary light of a color complementary to the color of said dyed layer.

7. The method of inspecting a contour of an object comprising, providing a transparent plate, coating a surface of said plate with a layer containing a dye, removing portions of said coating to provide clear sections which constitute an enlarged reproduction of the final contour of said object projecting an enlarged shadow image of said contour onto the rear surface of said coated plate, and providing an auxiliary color means for illuminating said rear surface, said auxiliary means having a color complementary to the color of said layer containing a dye so as to be visible only at said sections.

8. The method of inspecting a contour of an object comprising, providing a transparent plate, coating the front surface of said plate with a layer of gelatin containing a green dye, removing portions of said coating to provide clear uncoated sections having greater transparency than said coating and constituting an enlarged representation of the final contour of said object, directing and projecting an enlarged shadow image of said contour onto the rear surface of said plate so that said shadow image will be visible from the front of the plate, and illuminating the rear surface of said plate with light from a magenta light source the rays of which will be absorbed by said dye but which will provide a magenta illumination for said sections to provide a color contrast between said layer and said sections.

9. The method of inspecting a contour of an object comprising, providing a transparent plate, coating the front surface of said plate with a layer of gelatin containing a green dye, removing portions of said coating to provide clear uncoated sections having greater transparency than said coating and constituting an enlarged representation of the final contour of said object, directing a substantially white light across said contour to provide a colorless shadow image thereof, enlarging said image by projecting and directing it onto the rear surface of said plate, directing a magenta light against the rear surface of said plate so that said magenta light will be absorbed by said green layer but will be visible through said sections when said shadow image does not coincide with said sections but such coincidence then causing said shadow to uncover said sections to render the white light effective to illuminate the latter.

LESTER E. BLISS.

REFERENCES CITED

The following references are of record in the file of this patent:

UNITED STATES PATENTS

| Number | Name | Date |
| --- | --- | --- |
| 1,262,180 | Davis | Apr. 9, 1918 |
| 1,319,820 | Williams | Oct. 28, 1919 |
| 1,334,853 | Griffith | Mar. 23, 1920 |
| 1,545,674 | MacKay | July 14, 1925 |
| 1,694,706 | Herz | Dec. 11, 1928 |
| 2,035,780 | Beardsley et al. | Mar. 31, 1936 |
| 2,192,529 | Thomas et al. | Mar. 5, 1940 |
| 2,222,414 | Kudar | Nov. 19, 1940 |
| 2,360,772 | Hedin | Oct. 17, 1944 |
| 2,365,613 | Wibmer et al. | Dec. 19, 1944 |
| 2,372,470 | Bergstrom et al. | Mar. 27, 1945 |
| 2,381,164 | Hedin | Aug. 7, 1945 |
| 2,406,451 | Borkenstein | Aug. 27, 1946 |